United States Patent [19]

Matsubara et al.

[11] Patent Number: 5,024,511
[45] Date of Patent: Jun. 18, 1991

[54] DISPLAY APPARATUS

[75] Inventors: Ken Matsubara; Itaru Saito; Hirohisa Kitano; Kouichi Shingaki; Tomohiko Masuda, all of Osaka, Japan

[73] Assignee: Minolta Camera Kabushiki Kaisha, Osaka, Japan

[21] Appl. No.: 343,006

[22] Filed: Apr. 25, 1989

[30] Foreign Application Priority Data

Apr. 25, 1988 [JP] Japan .................. 63-102072

[51] Int. Cl.$^5$ .......................... G02F 1/03; G02F 1/01; G02B 5/30
[52] U.S. Cl. .................................... 350/356; 350/355; 350/374
[58] Field of Search ............... 350/374, 384, 388, 390, 350/356, 333, 339 F, 355

[56] References Cited

U.S. PATENT DOCUMENTS

| 3,823,998 | 7/1974 | Yazaki et al. | 350/389 |
| 4,158,201 | 6/1979 | Smith et al. | 350/374 |
| 4,533,217 | 8/1985 | Samek | 350/392 |
| 4,569,573 | 2/1986 | Agostinelli | 350/320 |
| 4,707,081 | 11/1987 | Mir | 350/388 |
| 4,709,995 | 12/1987 | Kuribayashi et al. | 350/333 |
| 4,765,721 | 8/1988 | Agostinelli et al. | 350/389 |
| 4,922,240 | 5/1990 | Duwaer | 350/333 |

FOREIGN PATENT DOCUMENTS

| 0182015 | 8/1986 | Japan | 350/356 |
| 0079418 | 4/1987 | Japan | 350/356 |
| 62-258429 | 11/1987 | Japan | . |

Primary Examiner—Eugene R. Laroche
Assistant Examiner—Evelyn A. Lester
Attorney, Agent, or Firm—Price, Gess & Ubell

[57] ABSTRACT

A display apparatus comprising a modulator sandwiched between two polarizers. The modulator includes a plurality of light transmitting windows arranged in a matrix on a substrate having an electrooptical effect. Each window is associated with an electrode pair for forming an electric field across the window. One scanning line electrically interconnects first electrodes in the electrode pairs of the windows arranged in a row. One signal line electrically interconnects second electrodes in the electrode pairs of the windows arranged in a column. A scanning circuit sequentially and individually electrifies the scanning lines. A signal circuit is operable in response to a synchronizing signal received from the scanning circuit and display information for electrifying one of the signal lines connected to the electrode pair of a selected window for forming an electric field. An electric field control circuit provides zero potential difference in the electrode pairs of the other windows than the selected window.

20 Claims, 5 Drawing Sheets

DISPLAY APPARATUS

BACKGROUND OF THE INVENTION

1. Field of the Invention

The present invention relates to a display apparatus comprising a plurality of light transmitting windows arranged in matrix form for defining display pixels, displays being made by controlling light transmission through the respective windows in response to display information. More particularly, the invention relates to a display apparatus as noted above, which includes a modulator for electrooptically modulating light passing through the respective light transmitting windows and controlling the amount of light passing through the windows by a combination of polarizers disposed at entry and exit sides, and a control device for controlling the modulator in response to the display information.

2. Description of the Prior Art

A known display apparatus of this type, as shown in FIGS. 7 and 8, comprises two polarizers 1 and 2 and a modulator 3 interposed therebetween. The modulator 3 includes a first optical element 10, an intermediate polarizer 11 and a second optical element 12. The first optical element 10 includes a plurality of light transmitting strips A1-An extending vertically and juxtaposed horizontally, and electrodes EA for forming electric fields to effect a 90-degree turn of a plane of polarization of light entering from the polarizer 1 for transmission through the respective light transmitting strips A1-An. The intermediate polarizer 11 allows passage only of the light entering from the first optical element 10 with the plane of polarization turned 90-degrees. The second optical element 12 includes a plurality of light transmitting strips B1-Bm extending horizontally and juxtaposed vertically, and electrodes EB for forming electric fields to effect a 90-degree turn of the plane of polarization of light entering from the intermediate polarizer 11 for transmission through the light transmitting strips B1-Bm. Thus, light transmitting windows are defined in matrix form by positions of overlapping between the light transmitting strips A1-An of the first optical element 10 and the light transmitting strips B1-Bm of the second optical element 12. (See Japanese Patent Publication Kokai No. 62-258429, for example.)

More particularly, when allowing passage of light through the light transmitting window at a selected coordinate position (p, q), electric fields are formed across the qth column light transmitting strip Aq of the first optical element 10 and the pth row light transmitting strip Bp of the second optical element 12. This electric field formation produces the following results:

(1) The first optical element 10 effect a 90-degree turn of the plane of polarization of only the light entering the qth column light transmitting strip Aq from the polarizer 1 at the entry side.

(2) The intermediate polarizer 11 allows passage of only the incident light from the qth light transmitting strip Aq with the plane of polarization turned 90 degrees.

(3) The second optical element 12 effects a 90-degree turn of the plane of polarization of only the light entering the pth row light transmitting strip Bp from the intermediate polarizer 11.

(4) The polarizer 2 at the exit side allows passage of only the incident light from the pth light transmitting strip Bp with the plane of polarization turned 90 degrees.

As noted above, the modulator of the known display apparatus has a three-piece construction consisting of two optical elements and one polarizer. This construction has the disadvantages of high manufacturing cost and a large thickness in the direction of light transmission.

SUMMARY OF THE INVENTION

An object of the present invention is to improve the known display apparatus described above, with a less expensive and more compact modulator.

The above object is fulfilled, according to the present invention, by a display apparatus comprising a plurality of light transmitting windows arranged in a matrix on a solid-state modulator substrate having an electrooptical effect, the matrix including a plurality of rows and a plurality of columns; a plurality of electrode pairs formed on one of an entry side surface and an exit side of the solid-state modulator substrate for forming electric fields across the light transmitting windows, respectively; voltage application means for applying a voltage to each of the electrode pairs; a plurality of scanning lines each electrically interconnecting first electrodes in the electrode pairs associated with the light transmitting windows arranged in one of the rows; a plurality of signal lines each electrically interconnecting second electrodes in the electrode pairs associated with the light transmitting windows arranged in one of the columns; a scanning circuit for sequentially and individually electrifying the scanning lines; a signal circuit operable in response to a synchronizing signal received from the scanning circuit and display information for electrifying one of the signal lines connected to the electrode pair associated with a selected light transmitting window for forming an electric field; an electric field control circuit for providing zero potential difference in the electrode pairs associated with the other light transmitting windows than the selected light transmitting window driven by the scanning circuit and the signal circuit for forming the electric field in accordance with the display information; a first polarizer disposed on the entry side surface of the solid-state modulator substrate; and a second polarizer disposed on the exit side surface of the solid-state modulator substrate.

In the above construction, the scanning circuit and signal circuit are operable in response to display information for producing a potential difference in the electrode pair associated with a selected light transmitting window on the solid-state modulator substrate, thereby to modulate light passing through the selected window. Thus, the single solid-state modulator substrate carrying the electrode pairs in matrix form may act as a modulator.

For clarifying the characterizing feature of the invention, an assumption may be made here in which a potential difference is produced in a given electrode pair simply by electrifying the scanning lines and signal lines. In this case, no potential difference occurs in the other electrode pairs sharing the same scanning line or signal line with the given electrode pair, but a potential difference does occur in the remaining electrode pairs. FIG. 2 is used here in order to give a specific example. Suppose a potential difference is produced in an electrode pair E11 in the first row and the first column by applying a voltage to the first scanning line Z1 and the first signal line L1, whereby the electrode connected to the scanning Z1 has a negative polarity and the electrode connected to the signal line L1 a positive polarity.

In this case, the remaining scanning lines Z2-Zm with a positive polarity have a higher electric potential than the remaining signal lines L2-Ln with a negative polarity. The electrodes in the electrode pairs E12-E1n connected to the first scanning line Z1 both have a negative polarity, whereas the electrodes in the electrode pairs E21-Em1 connected to the first signal line L1 both have a positive polarity. Consequently, no potential difference occurs in any one of the electrode pairs E12-E1n and E21-Em1. However, in the remaining electrode pairs E22-Emn, such as the electrode pair E22 in the second row and the second column, for example, the electrode connected to the second scanning line Z2 has a positive polarity while the electrode connected to the second signal line L2 has a negative polarity, thereby producing a potential difference. Thus, electric fields, weak as they may be, are formed across the light transmitting windows W22-Wmn having such electrode pairs E22-Emn, thereby effecting modulation of light passing therethrough.

This means that light is transmitted not only through a selected window but through other windows also, which is undesirable.

To eliminate this inconvenience, the present invention provides the electric field control circuit for setting zero potential difference to the electrode pairs except for the electrode pair for forming the electric field across a selected window. This field control circuit positively prevents a potential difference from occurring in the electrode pairs except for a selected electrode pair. There is, thus, no possibility of electric fields being formed across windows other than a selected window to modulate light passing therethrough.

As will be understood from the foregoing explanation, the present invention provides an inexpensive and compact display apparatus by forming a modulator with a single solid-state modulator substrate. This apparatus assures reliable control of the amount of light transmission through only selected windows, thereby realizing clear displays.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

An embodiment of the present invention will be described hereinafter.

Figure 1:
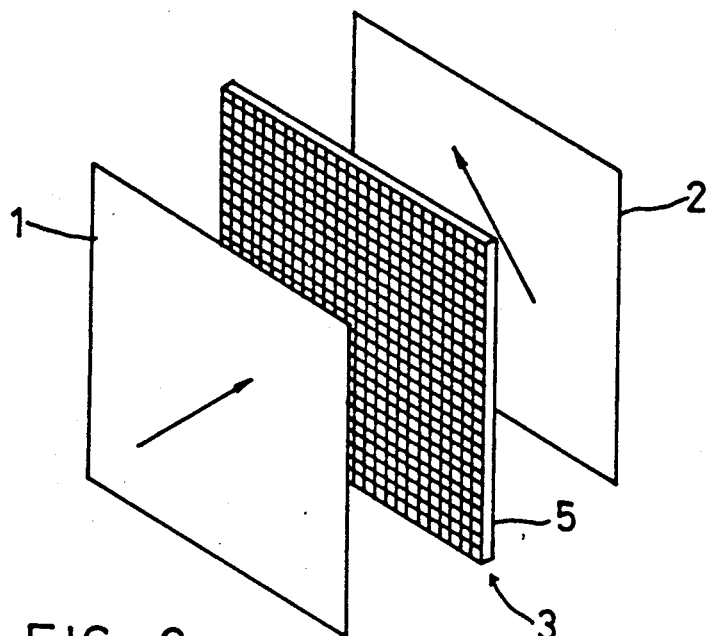
FIG. 1 is a perspective view showing an outline of a display apparatus, particularly a modulator, according to the present invention.
Figure 2:
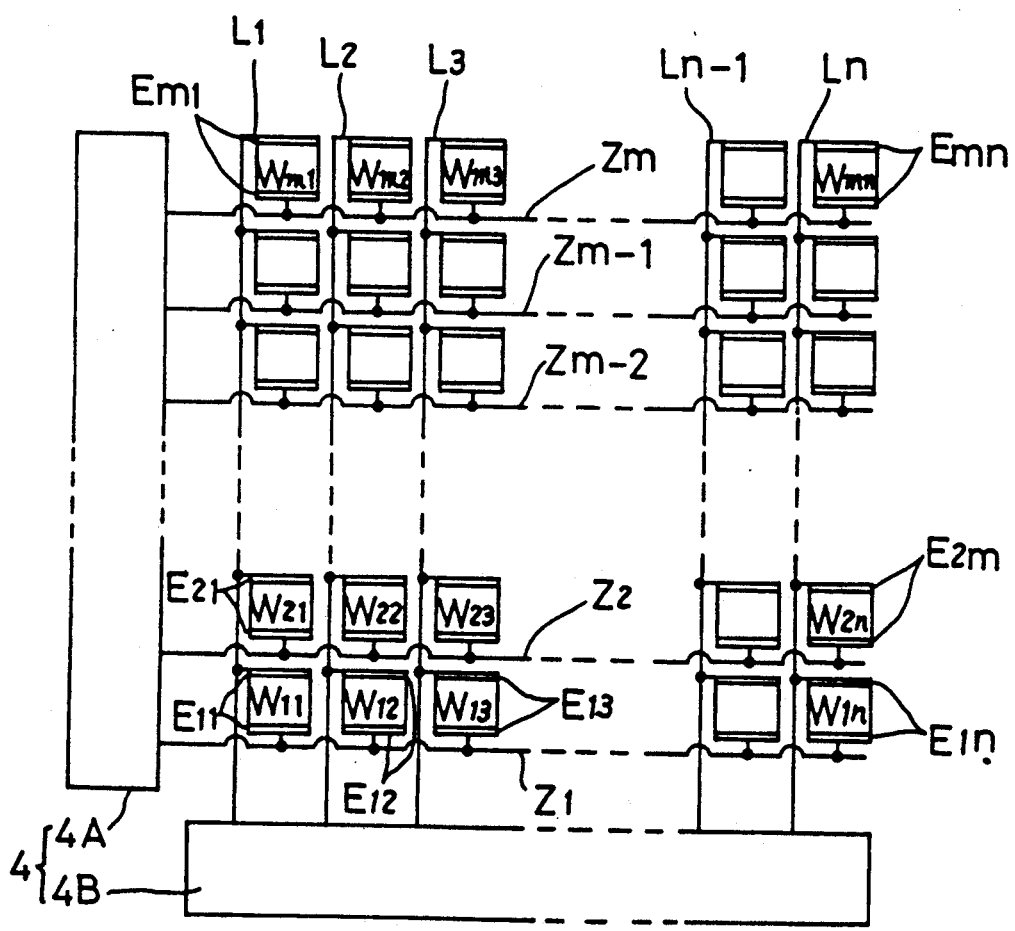
FIG. 2 is a schematic view illustrating the construction of the display apparatus.

Referring to FIGS. 1 and 2, a display apparatus comprises polarizers 1 and 2 disposed at an entry side and an exit side, respectively, and a modulator 3 interposed therebetween. The modulator 3 defines a plurality of light transmitting windows in matrix form for defining display pixels. The matrix is made up of 525 rows and 700 columns of windows, by way of a real number example. The modulator 3 electrooptically modulates light passing through each window, and opens and closes each window in cooperation with the polarizers 1 and 2 which are in a crossed-nicol arrangement. This display apparatus further comprises a control device 4 for controlling the modulator 3 in response to display information. Thus, light from a light source is allowed to pass only through selected windows for making displays.

As shown in FIG. 2, the modulator 3 includes a solid-state modulator substrate 5 formed of PLZT or the like, on which light transmitting window elements W11-Wmn are arranged in matrix form. The substrate 5 further supports a plurality of electrode pairs E11-Emn on an entry surface thereof for forming electric fields across the window elements W11-Wmn, respectively. Each of these electric fields turns a plane of polarization of light 90 degrees in the same direction as the plane of polarization provided by the polarizer 2 at the exit side. The substrate 5 also supports a plurality (m) of scanning lines Z1-Zm and a plurality (n) of signal lines L1-Ln. Each of the scanning lines Z1-Zm electrically interconnects electrodes of one polarity Ei in the electrode pairs Ei1-Ein associated with the respective window elements Wi1-Win arranged in one row i. Each of the signal lines L1-Ln electrically interconnects electrodes of the other polarity Ej in the electrode pairs E1j-Emj associated with the respective window elements W1j-Emj in one column j.

Figure 4:
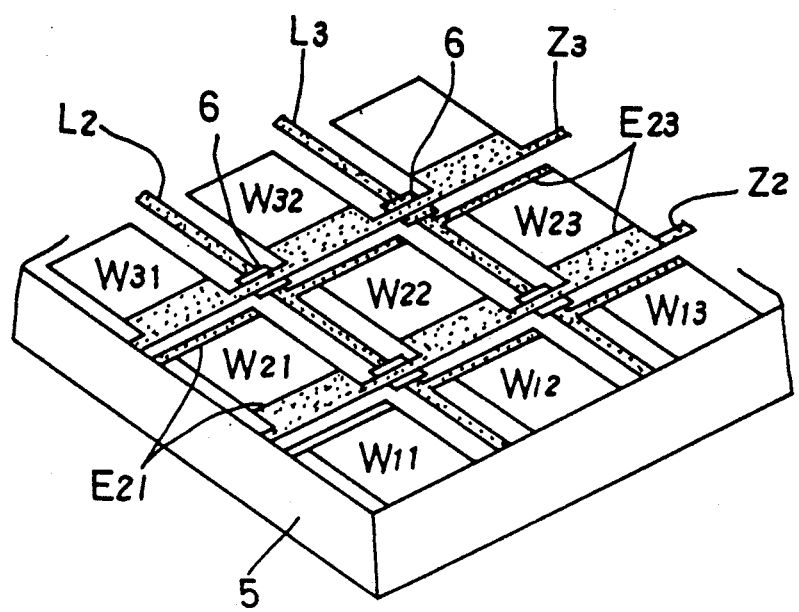
FIG. 4 is a perspective view of a principal portion of the display apparatus.

In a specific construction as shown in FIG. 4, the substrate 5 has an entry surface formed planar, and the electrode pairs E11-Emn, scanning lines Z1-Zm and signal lines L1-Ln are formed by patterning on this planar surface. The scanning lines Z1-Zm and signal lines L1-Ln intersecting one another are separated by insulating films 6 formed of $SiO_2$, $Si_3N_4$ or the like.

Figure 3:
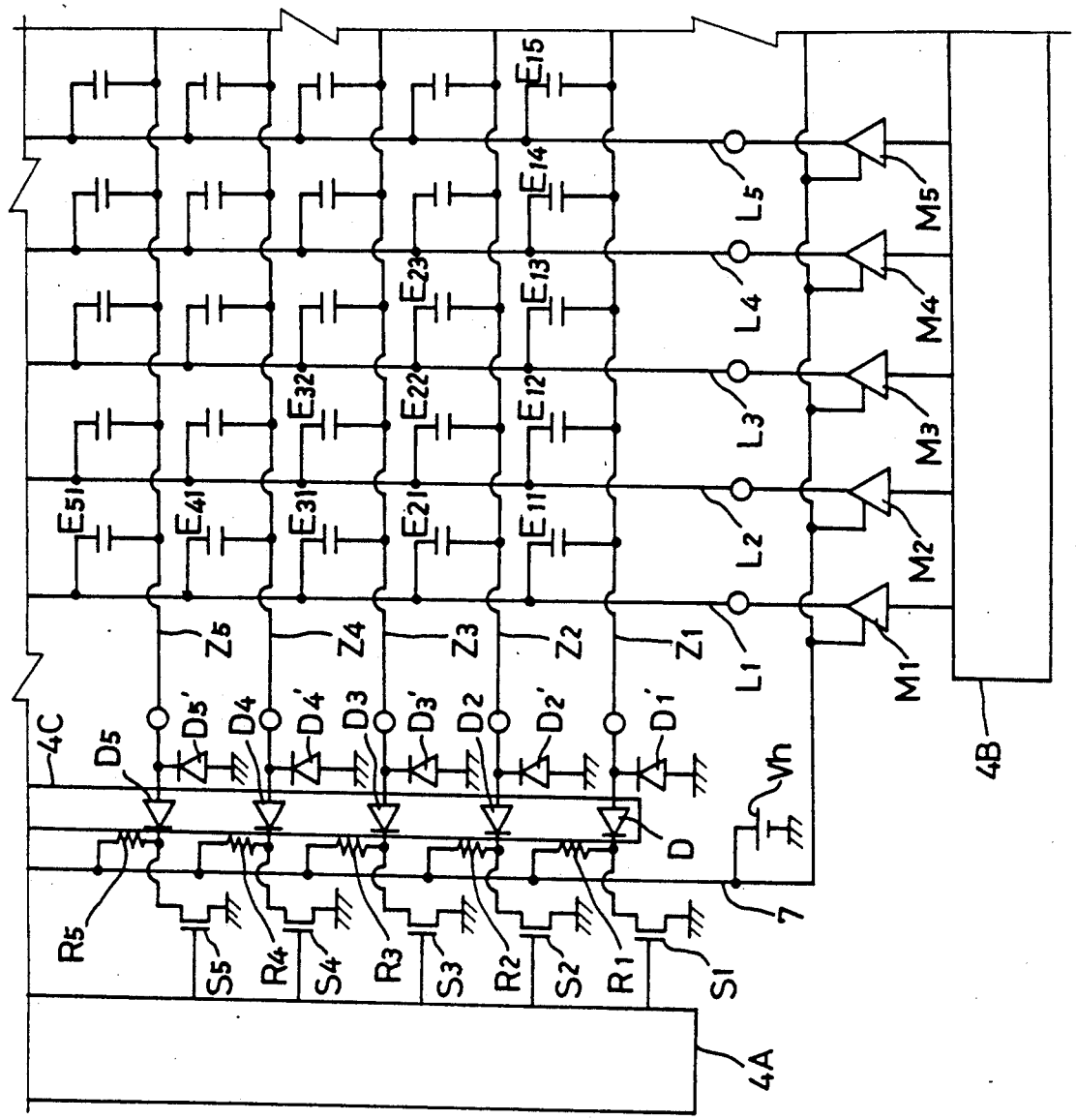
FIG. 3 is a block diagram of a control circuitry.

As also shown in FIG. 3, the control device 4 includes a scanning circuit 4A, a signal circuit 4B and an electric field control circuit 4C. The scanning circuit 4A is operable for sequentially and individually electrifying the scanning lines Z1-Zm of the modulator 3. The signal circuit 4B is operable in response to a synchronizing signal received from the scanning circuit 4A and the display information for electrifying a signal line Lq connected to the electrode pair Epq of a selected window element Wpq to form the electric field. The field control circuit 4C is operable for setting zero potential difference for the electrode pairs E11-Emn of the other window elements than the above-mentioned selected window element Wpq.

The scanning circuit 4A includes electrodes connected to gates of FETs S1-Sm. The FETs S1-Sm have sources grounded, and drains connected to a driving source line 7 through resistors R1-Rm and to the scanning lines Z1-Zm through diodes D1-Dm constituting the electric field control circuit 4C. The scanning lines Z1-Zm are grounded through discharging diodes D'1-D'm.

The signal circuit 4B includes electrodes connected to high voltage signal drive elements M1-Mn connected to the source line 7. The drive elements M1-Mn have output terminals connected to the signal lines L1-Ln.

The control device 4 operates as follows:

Assuming that the window element W11 in the first row and the first column is selected for electric field formation, the scanning circuit 4A turns on the FET S1 to set its drain to ground potential, and simultaneously the signal circuit 4B sets the output of the high voltage signal drive element M1 to Vh. As a result, a potential difference is produced in the electrode pair E11 whereby a current flows from the signal line L1 to the scanning line Z1. No potential difference occurs at the other electrode pairs E21-Em1 connected to the signal line L1 since the other FETs S2-Sn are turned off to maintain the scanning lines Z2-Zm at Vh. No potential difference occurs also at the other electrode pairs E12-E1m connected to the scanning line Z1 since these electrode pairs are grounded. Further, no potential difference occurs at the remaining electrode pairs E22-Emn since the diodes D2-Dm of the electric field control circuit 4C prevent current flows in the opposite direction though the signal lines L2-Ln are maintained in OV and the scanning lines Z2-zm in Vh.

The electrode pair Epq with the potential difference is returned to zero potential difference by restoring the signal line Lq to ground potential and releasing the charge through the discharging diode D'p.

The Vp signifies a half-wave voltage for turning the plane of polarization 90 degrees with maximum efficiency.

Other embodiments are listed below.

Figure 5:
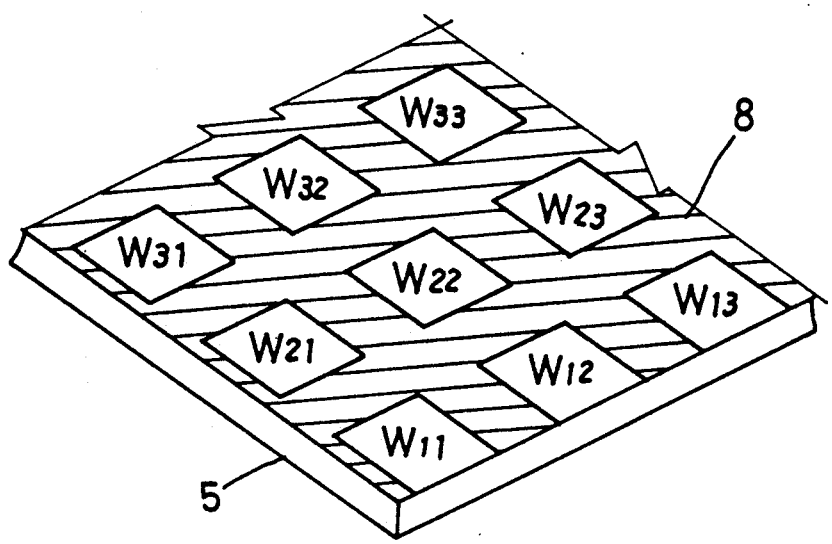
FIGS. 5 and 6 are perspective views showing different embodiments of the present invention, respectively.

(1) As shown in FIG. 5, a mask 8 may be provided for covering the entire substrate 5 except the window elements W11-Wmn in order to prevent leakage of light.

Figure 6:
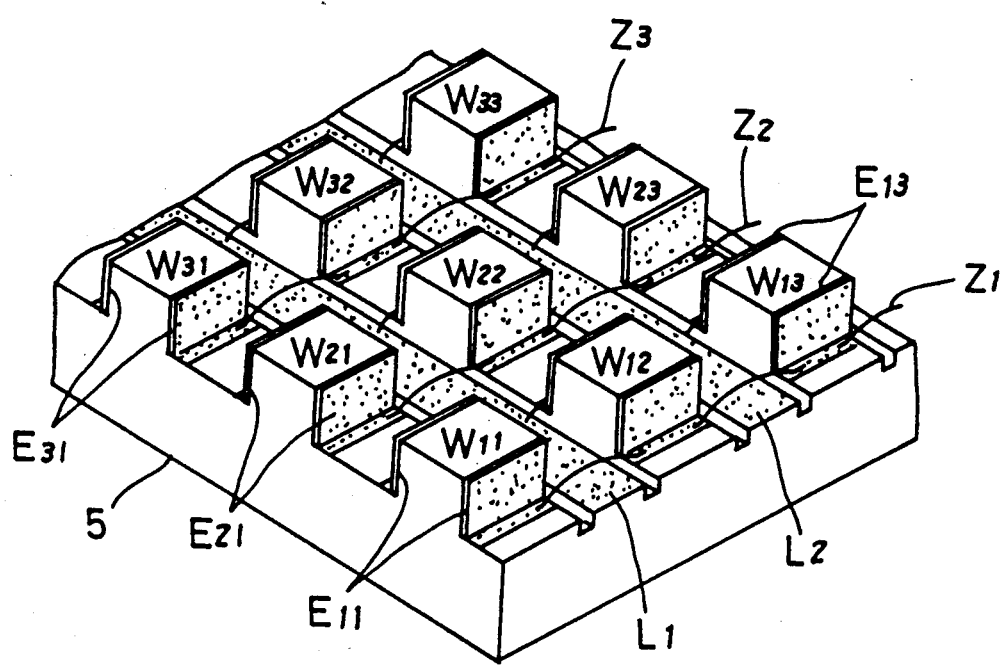
Figure 7:
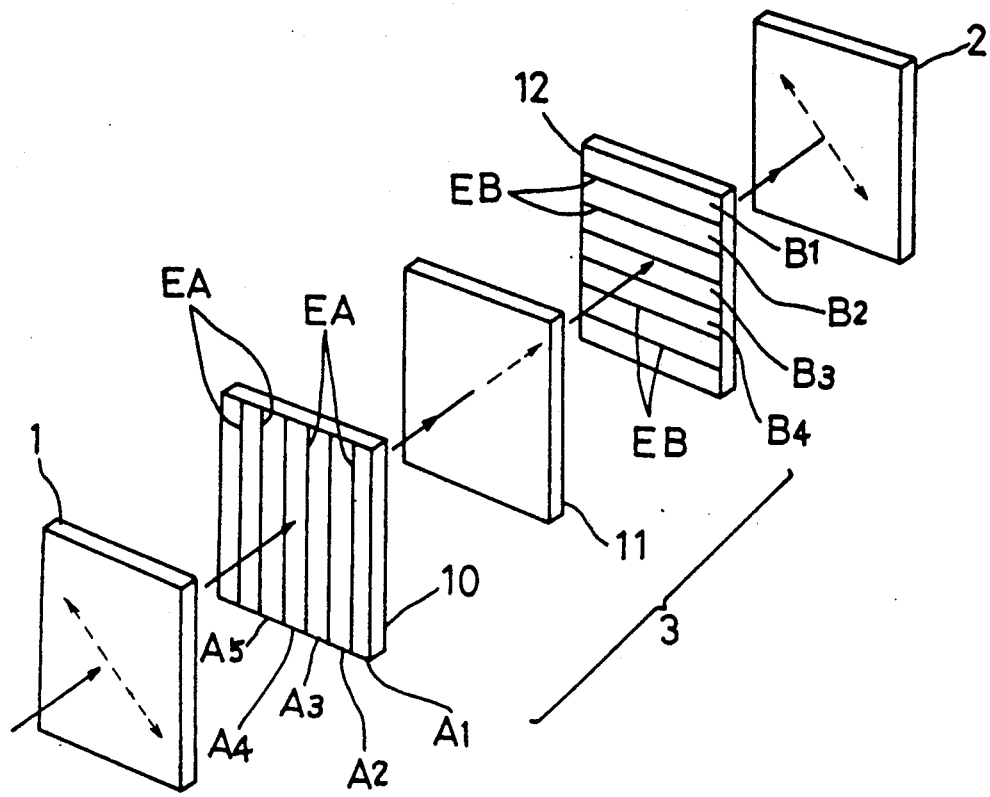
FIGS. 7 and 8 are a perspective view and a front view illustrating a prior art apparatus.
Figure 8:
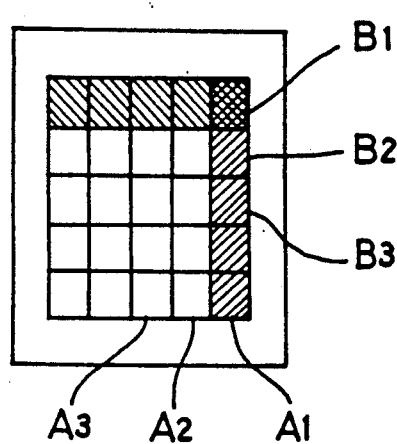

(2) In the described embodiment, the window elements W11-Wmn are formed flush with the other parts. As shown in FIG. 6, the window elements W11-Wmn may project from the other parts, with the electrode pairs E11-Emn applied to lateral sides of the window elements W11-Wmn so that flat surfaces of each electrode pair are opposed to each other. This construction has the advantage of necessitating only a low drive voltage.

(3) In the described embodiment, the light transmitting windows are opened and closed by setting the potential difference of the electrode pairs E11-Emn to Vh or zero. According to the present invention, the amount of light transmission may be varied by varying the voltage applied to the electrode pairs E11-Emn, specifically by varying the voltage applied to the signal lines L1-Ln, thereby to change the efficiency of turning the plane of polarization.

(4) In the described embodiment, the diodes D1-Dm are connected to the scanning lines Z1-Zm for producing a potential difference only in the electrode pair Epq of a selected window element Wpq for forming an electric field. Instead, the potential difference may be produced by an operation through the signal lines L1-Ln.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display apparatus comprising:

a plurality of light transmitting windows arranged in a matrix on a solid-state modulator substrate having an electrooptical effect, said matrix including a plurality of rows and a plurality of columns;

a plurality of electrode pairs formed on one of an entry side surface and an exit side surface of said solid-state modulator substrate for forming electric fields across said light transmitting windows, respectively;

voltage application means for applying a voltage to each of said electrode pairs;

a plurality of scanning lines each electrically interconnecting first electrodes in the electrode pairs associated with the light transmitting windows arranged in one of said rows;

a plurality of signal lines each electrically interconnecting second electrodes in the electrode pairs associated with the light transmitting windows arranged in one of said columns;

a scanning circuit for sequentially and individually electrifying said scanning lines;

a signal circuit operable in response to a synchronizing signal received from said scanning circuit and display information for electrifying one of said signal lines connected to the electrode pair associated with a selected light transmitting window for forming an electric field;

an electric field control circuit for providing zero potential difference in the electrode pairs associated with the light transmitting windows except for said selected light transmitting window driven by said scanning circuit and said signal circuit for forming the electric field in accordance with said display information;

a first polarizer disposed on the entry side surface of said solid-state modulator substrate; and a second polarizer disposed on the exit side surface of said solid-state modulator substrate.

2. A display apparatus as claimed 1, wherein said scanning circuit is connected to said scanning lines through said electric field control circuit.

3. A display apparatus as claimed in claim 2, wherein said electric field control circuit includes diodes connected in a direction for allowing a selected electrode pair to be driven by said scanning circuit and said signal circuit forming the electric field.

4. A display apparatus as claimed in claim 3, wherein said electric field control circuit includes discharging diodes connected in an opposite direction to said diodes, each of said discharging diodes being connected at one end thereof between one of said diodes and said electrodes, and grounded at the other end thereof.

5. A display apparatus as claimed in claim 1, wherein said signal circuit is connected to said signal lines through high voltage signal drive elements.

6. A display apparatus as claimed in claim 1, wherein said solid-state modulator substrate includes a mask for covering other parts than said light transmitting windows.

7. A display apparatus as claimed in claim 1, wherein said voltage application means applies a half-wave voltage to said electrode pairs.

8. A display as claimed in claim 1, wherein said voltage application means applies a variable voltage to said electrode pairs.

9. A display apparatus as claimed in claim 1, wherein intersections of said signal lines and said scanning lines are separated by insulating films.

10. A display apparatus as claimed in claim 1, wherein said solid-state modulator substrate is formed of PLZT.

11. A display apparatus comprising:
- a plurality of three-dimensional light transmitting windows formed of a solid-state modulator substrate having an electrooptical effect, and arranged in a matrix including a plurality of rows and a plurality of columns;
- a plurality of electrode pairs each formed on lateral surfaces of one of said three-dimensional light transmitting windows so as to be opposed to each other for forming an electric field across the light transmitting window;
- voltage application means for applying a voltage to each of said electrode pairs;
- a plurality of scanning lines each electrically interconnecting first electrodes in the electrode pairs associated with the light transmitting windows arranged in one of said rows;
- a plurality of signal lines each electrically interconnecting second electrodes in the electrode pairs associated with the light transmitting windows arranged in one of said columns;
- a scanning circuit for sequentially and individually electrifying said scanning lines;
- a signal circuit operable in response to a synchronizing signal received from said scanning circuit and display information for electrifying one of said signal lines connected to the electrode pair associated with a selected light transmitting window for forming an electric field;
- an electric field control circuit for providing zero potential difference in the electrode pairs associated with the light transmitting windows except for said selected light transmitting window driven by said scanning circuit and said signal circuit for forming the electric field in accordance with said display information;
- a first polarizer disposed on the entry side surface of said solid-state modulator substrate; and
- a second polarizer disposed on the exit side surface of said solid-state modulator substrate.

12. A display apparatus as claimed in claim 11, wherein said scanning circuit connected to said scanning lines through said electric field control circuit.

13. A display apparatus as claimed in claim 12, wherein said electric field control circuit includes diodes connected in a direction for allowing a selected electrode pair to be driven by said scanning circuit and said signal circuit for forming the electric field.

14. A display apparatus as claimed in claim 13, wherein said electric field control circuit includes discharging diodes connected in an opposite direction to said diodes, each of said discharging diodes being connected at one end thereof between one of said diodes and said electrodes, and grounded at the other end thereof.

15. A display apparatus as claimed in claim 11, wherein said signal circuit is connected to said signals lines through high voltage signal drive elements.

16. A display apparatus as claimed in claim 11, wherein said solid-state modulator element includes a mask for covering other parts than said light transmitting windows.

17. A display apparatus as claimed in claim 11, wherein said voltage application means applies a half-wave voltage to said electrode pairs.

18. A display apparatus as claimed in claim 11, wherein said voltage application means applies a variable voltage to said eletrode pairs.

19. A display apparatus as claimed in claim 11, wherein intersections of said signal lines and said scanning lines are separated by insulating films formed of a material selected from $SiO_2$, $Si_3N_4$ and the like.

20. A display apparatus as claimed in claim 11, wherein said solid-state modulator element is formed of PLZT.

* * * * *